3,085,306
STAY RODS
John Drysdale, Leeds, England, assignor to Cable Covers Limited, London, England, a company of Great Britain
Filed June 24, 1960, Ser. No. 38,532
Claims priority, application Great Britain July 1, 1959
6 Claims. (Cl. 24—126)

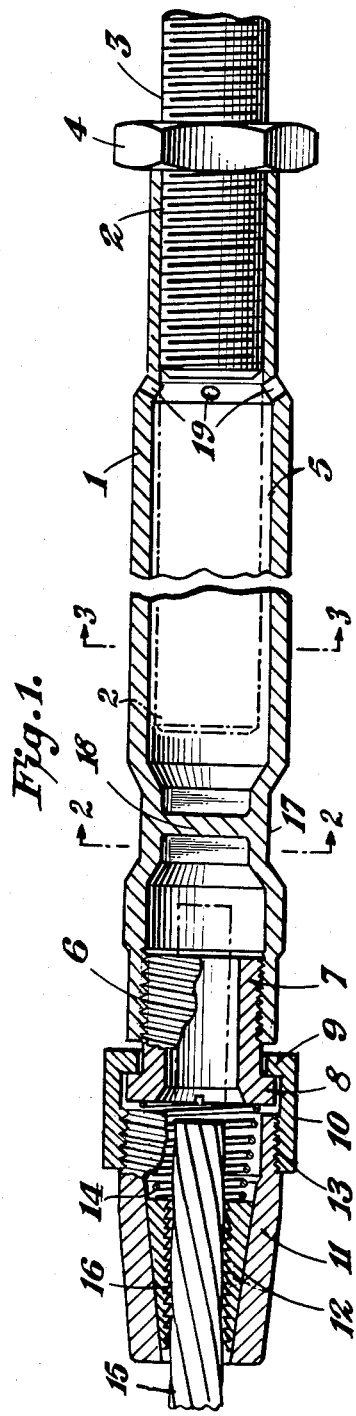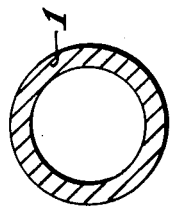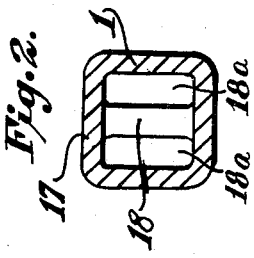

This invention relates to stay rod devices of the kind commonly used in pole-staying, such as for anchoring the stay wires of telegraph poles and poles for overhead transmission lines.

Known stay rod devices suffer from the disadvantage that, in use, they require ancillary tensioning devices to effect connection of a stay wire thereto and furthermore the use of such ancillary devices leads to loss of construction time and also requires the step of "making-off" the stay wire, which leads to wastage of material.

It is among the objects to overcome these disadvantages and to provide a stay rod device which in use enables automatic connection with a stay wire which has been previously cut to the required length without the use of ancillary tensioning devices.

According to the present invention, therefore, a stay rod device for use with an anchor rod adapted to be secured in the ground, comprises a head member which is threaded for connection to the anchor rod and to permit of telescopic axial movement relative thereto upon turning movement of the head, and an automatic connector including a sleeve having mounted internally thereof spring loaded gripping means to grip a stay wire, said connector being carried by the head member in such manner that tensioning of the stay wire can be effected by turning the head member relative to the connector without imparting twist to the stay wire.

In a preferred construction the head member is completely closed in and is provided with drain holes to prevent the collection of rain water therein, part or all of its exterior surface being provided with flats to enable turning thereof to be effected by a spanner or like tool.

The invention is diagrammatically illustrated by way of example in the accompanying drawing, in which, FIGURE 1 is a longitudinal section of a stay wire tensioning device according to the invention, FIGURE 2 is a cross-section on the line 2—2 of FIGURE 1, and FIGURE 3 is a cross-section on the line 3-3 of FIGURE 1.

Referring to the drawing, the stay wire device comprises a head member 1 of generally tubular form which is screw-threaded at one end portion at 2 to receive a corespondingly screw-threaded anchor rod 3. One end of the anchor rod, which is provided with a locking nut 4 for locking it in any desired position, is adapted to be secured in the ground in such manner that it is fixed and immovable, the other end of the anchor rod being arranged to extend into the hollow interior 5 of the head member 1. The opposite end of the head member is internally screw-threaded at 6 to receive a connector plug 7 which is formed with an outwardly extending flange 8 arranged to engage a corresponding inwardly directed flange 9 formed on a cup-shaped member 10 which forms part of a sleeve member 11. The sleeve member has mounted therein two semi-circular wedges 12 and is screw-threaded at 13 for connection to the cup-shaped member 10.

The outer peripheral faces of the wedges 12 are tapered to correspond with tapered faces formed on the inner face of the sleeve member 11, and the wedges 12 are urged towards the outer end of the member 11, by means of a compression spring 14, in such manner that they are urged inwardly towards a stay wire 15 which, in use, is passed into the end of the sleeve member 11 between the wedges 12. The inner faces of the wedges 12 are serrated at 16 to improve their effectiveness.

Thus the sleeve member 11, the wedges 12 and the spring 14 form an automatic connector means for receiving and gripping the stay wire. The connector means and the head member 1 both being hollow, together provide a tubular assembly which is continuously hollow from the head member end portion 2 through the head member and the connector means.

The outer surface of the head member 1 is formed at 17 with flats providing a square wrench receiving section of reduced transverse dimension whereby it can be gripped by a spanner or wrench and turned together with the connector plug 7 relative to the connector means. An internal bridge member 18 is provided in the bore of the head member 1 to act as a stop, beyond which the stay wire 15 cannot be moved when introducing it to the wedges 12. The provision of a stop makes it impossible for the operator to introduce more than 3 or 4 inches of stay wire, and so there is no possibility of the end stay wire interfering with the threaded rod 3, and limiting the amount to which the head member 1 can be adjusted in order to increase the tension.

The bridge member 18 is so formed as to provide spaces 18a within the head member, alongside the bridge member, for drainage of water down through the head member towards the threaded end portion 2. Suitable drain holes 19 are provided to prevent the collection of rain water in the head member.

In use, the completely assembled device is transported to the site where the threaded end 2 of the head member 1 is screwed onto the free end of the anchor rod 3 which has previously been secured in the ground. The stay wire 15 is then cut to the required length and its free end inserted into the connector means between the wedges 12. This movement tends to force the wedges 12 apart against the action of the spring 14 so that when the pressure on the stay wire is released the serrated surfaces 16 of the wedges 12 tightly grip the stay wire. As the tension on the stay wire increases, due to the correspondingly tapered surfaces of the sleeve member 11 and the wedges 12, the pressure of the wedges on the stay wire also increases, thus providing a gripping pressure of increasing strength. It will be understood that initial gripping of the stay wire is effected merely by inserting the end of the stay wire into the connector means where it is automatically gripped by the wedges on releasing forward pressure.

After initial gripping, the stay wire is tensioned by turning the head member as hereinbefore described, thereby enabling the stay wire to be tensioned without twisting it in any way.

To prevent the connector means from unscrewing during turning of the head member 1 the screw-thread 2 is of opposite hand to that of the screw-threads 6 and 13. The connector means and the interior 5 of the head member 1 are arranged to receive respectively a sufficient length of stay wire and anchor rod to enable complete adjustment of the stay wire to be effected, but minor adjustments of the stay wire relative to its position in the connector means can be effected with the aid of a release key prior to the application of tension to the device.

The device according to the invention has the added advantage that it has no projecting parts, which makes it unnecessary to provide guards to prevent injury to personnel or cattle. Furthermore the device has no loose parts and is therefore completely self-contained and also saves considerable time and labour since it eliminates the necessity for auxiliary tensioning devices and the necessity for "making-off" the end of the stay wire.

What I claim is:

1. A stay rod device for use with an anchor rod adapted to be fixedly secured in the ground, comprising an elongated tubular head member which is screw-threaded at one end portion thereof for connection to said anchor rod in such manner as to permit of telescopic axial movement relative thereto upon turning movement of said head member, and hollow connector means mounted on the other end of said head member for rotation relative to and coaxial with respect to said head member and having means for holding said connector means against moving axially relatively away from said head member, said connector means and said head member providing a tubular assembly which is continuously hollow from said one end portion of said head member through said head member and said connector means, said connector means including a sleeve having at least its internal surface of tapered formation, and at least two spring loaded wedges the outer surfaces of which are of corresponding formation to that of said sleeve, said wedges serving in use automatically to grip the end of a stay wire projecting straight into said connector means, terminating within said device and being coaxial with said head member and said anchor rod, whereby tensioning of said stay wire in coaxial alignment with said head member and said anchor rod both within and beyond said connector means can be effected by turning said head member relatively to said connector means without imparting twist to said stay wire.

2. A stay rod device as claimed in claim 1, including a connecting plug secured within said head member and having an outwardly directed flange, and a cup shaped portion on said sleeve having an inwardly directed flange engageable with said outwardly directed flange for maintaining said sleeve against axial separation from said head member while permitting relative rotation of said sleeve and head member, said head member being provided internally with a stop for limiting the movement of insertion of the stay wire through said connecting means into said tubular assembly.

3. A stay rod device according to claim 2 in which said connecting plug is threaded into said head member at the end thereof opposite said one end, the anchor rod receiving threads and the connecting plug receiving threads being of opposite hand, whereby to prevent unscrewing of the connecting plug upon turning of said head member on said anchor rod in a direction for tensioning the stay wire.

4. A stay rod device acording to claim 1 in which said head member comprises an internal bridge extending across the axis of said head member between the head member ends and providing a stop for limiting the inserting of the stay wire end into said device.

5. A stay rod device according to claim 3 in which said bridge is formed to provide space alongside said bridge within said head member for drainage of water down through the latter past the bridge towards said threaded end portion of said head member, and in which said head member is formed with a drain hole adjacent the inner end of said threaded portion.

6. A unitary stay rod device comprising a head member of substantially tubular shape with a square wrench receiving section of reduced transverse dimension and provided with inside anchor rod receiving threads of one hand extending from one end towards the center of the head member and being provided at the opposite end with inside connector plug receiver threads of the opposite hand, a threaded anchor rod receivable in the head member anchor rod receiver, a connector plug threaded into the connector plug receiver end of the head member, said connector plug being outwardly flanged and being formed with a bore therethrough, a cup shaped member inwardly flanged to receive the outward flange of the connector plug in a rotatably slidable relationship, said cup shaped member being threaded on the inside of one of its ends, a threaded sleeve member receivable at one of its ends in the cup shaped member inner threads, the sleeve member being internally tapered inwardly towards its other end, a plurality of wedges slidably disposed within the sleeve member against the tapered inside wall thereof, and a coil spring disposed between the wedges and the connector plug, said spring forcing the wedges towards said other end of the sleeve member.

References Cited in the file of this patent

UNITED STATES PATENTS

| 1,586,920 | Schmuck | June 1, 1926 |
| 1,814,609 | Smith | July 14, 1931 |
| 1,880,193 | Blackburn | Oct. 4, 1932 |

FOREIGN PATENTS

| 377,479 | Germany | June 20, 1923 |
| 135,420 | Great Britain | Nov. 27, 1919 |